United States Patent [19]

Braithwaite

[11] 4,222,762
[45] Sep. 16, 1980

[54] GLASSWARE FORMING MACHINES

[75] Inventor: David Braithwaite, Doncaster, England

[73] Assignee: Emhart Industries, Inc., Farmington, Conn.

[21] Appl. No.: 19,194

[22] Filed: Mar. 9, 1979

[30] Foreign Application Priority Data

Mar. 17, 1978 [GB] United Kingdom ............... 10662/78

[51] Int. Cl.² ............................................ C03B 11/00
[52] U.S. Cl. ...................................... 65/226; 65/207; 65/305; 65/359
[58] Field of Search ................. 65/207, 226, 227, 229, 65/305, 359

[56] References Cited

U.S. PATENT DOCUMENTS 3,914,120  10/1975  Foster ................................... 65/229

Primary Examiner—Richard V. Fisher
Attorney, Agent, or Firm—H. Samuel Kieser

[57] ABSTRACT

A glassware forming machine comprises a carriage, a blank station at which parisons are formed in upwardly open parison moulds from gobs of molten glass, and a further station, the carriage being reciprocable in a straight line between the blank station and the further station in order to transfer parisons from the blank station to the further station. The carriage has a neck ring mould comprising neck ring parts and a guide ring which defines the sealing surface of the finish of each parison. The guide ring is biased upwardly by spring-loaded members which raise the guide ring when the carriage is at the further station in order that the guide ring should clear the released parisons on return movement of the carriage to the blank station.

6 Claims, 3 Drawing Figures

GLASSWARE FORMING MACHINES

BACKGROUND OF THE INVENTION

This invention relates to a glassware forming machine.

A known glassware forming machine has a blank station at which parisons are formed in an upwardly open parison mould from gobs of molten glass, and a movable carriage which transfers the parisons from the blank station to a further station of the machine, the carriage having a neck ring mould which separates to release the parisons at the further station. When each parison is released at the further station the parison is allowed to fall a short distance in order that the part of the neck ring mould defining the sealing surface of the parison clears the released parison on return movement of the carriage to the blank station.

SUMMARY OF THE INVENTION

According to the invention a glassware forming machine comprises a carriage, a blank station at which parisons are formed in upwardly open parison moulds from gobs of molten glass, and a further station, the carriage being reciprocable in a straight line between the blank station and the further station in order to transfer parisons from the blank station to the further station, the carriage having a neck ring mould comprising neck ring parts and an element which defines the sealing surface of the finish of each parison, and the carriage having means for raising and lowering said element relative to the neck ring parts, the element being raised when the carriage is at the further station in order that said element should clear the released parisons on return movement of the carriage to the blank station.

Since the element defining the sealing surface of the finish of each parison is lifted to clear the released parison at the further station, the latter need not be dropped after being released by the neck ring parts, as has occurred hitherto.

Preferably, the raising and lowering of the element is synchronised with opening and closing movement of the neck ring parts, respectively. The means for raising and lowering the element may comprise spring-loaded members which urge said element upwardly and co-operating surfaces on the element and on the neck rings, the co-operating surfaces interengaging when the neck ring parts are closed to hold the element in the lowered position against the influence of the spring-loaded members. The means for raising and lowering the element may alternatively comprise a fluid motor.

Said element may comprise a guide ring with a central through bore for guiding movement of a parison-forming plunger which passes through the guide ring and into the parison mould at the blank station, the neck ring parts being relatively movable in a straight line perpendicular to the direction of movement of the carriage.

BRIEF DESCRIPTION OF DRAWINGS

The carriage of a glassware forming machine according to the invention will now be described, by way of example, with reference to the accompanying drawings, in which.

DESCRIPTION OF THE PREFERRED EMBODIMENT

The carriage 1 is guided by two horizontally spaced guide rails 2 for reciprocatory straight line motion between a blank station, at which parisons are formed in upwardly open parison moulds from gobs of molten glass, and a further intermediate station at which the parisons are further formed. The parisons are moved from the intermediate station to a final blow station and thence to a deadplate of the machine by blowhead and tong mechanisms, for example in the manner disclosed in British Pat. No. 1,491,859 (corresponding to U.S. Pat. No. 3,914,120). The carriage 1 is reciprocated horizontally between the blank station (at which the carriage is shown in FIG. 1) and the intermediate station by means of fluid motors the cylinders of which are indicated at 3 in FIG. 1.

Since the machine is intended for double gob operation, the neck ring carriage 1 includes a neck ring mould for each of the two parison moulds. To control movement of the neck ring moulds, the carriage 1 carries on its underside four piston and cylinder devices 4 (FIG. 2) operated by compressed air led to the carriage through bores 5 in the guide rails 2, in the manner disclosed in our co-pending U.S. patent application Ser. No. 019,052 filed Mar. 9, 1979.

Figure 1:
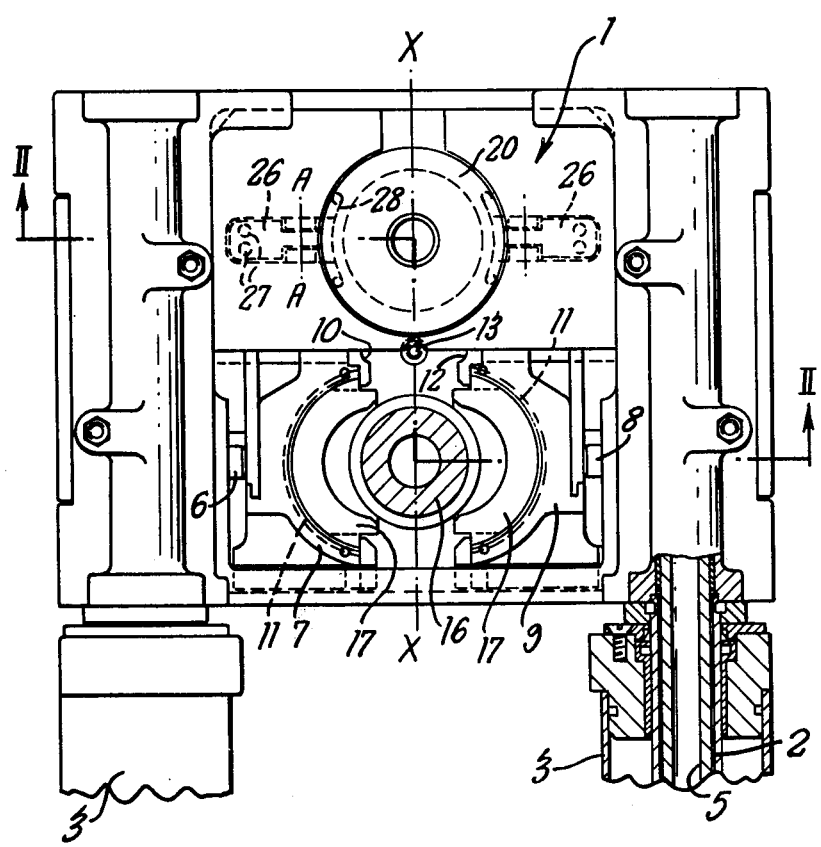
FIG. 1 is a plan view, partially in section, of the carriage.

The two piston rods 6 of the two piston and cylinder devices 4 disposed on the left-hand side of the centre line X—X of FIG. 1, are connected to a common neck ring holder 7 which is guided for movement in a straight line perpendicular to the direction X—X. Similarly, the two piston rods 8 of the two piston and cylinder devices 4 disposed on the right-hand side of the axis X—X as viewed in FIG. 1 are connected to a further common neck ring holder 9 which is also guided for movement in a direction perpendicular to the axis X—X. The upper half of FIG. 1 shows the neck ring holders 7 and 9 in a closed position (corresponding to an extended position of the piston rods 6 and 8), whereas the lower half of FIG. 1 shows the neck ring holders 7 and 9 in an open position (corresponding to a retracted position of the piston rods 6 and 8). In the closed position of the neck ring holders 7 and 9, facing semi-circular recesses formed in retaining plates 10 and 12 locate around a central vertical pin 13 of the carriage 1. The plate 10 is connected to the neck ring holder 7 and the plate 12 is similarly connected to the neck ring holder 9.

The piston rods 6 and 8 are connected to the neck ring holders 7 and 9 through the intermediary of plates 14 and 15, respectively, the thickness of which determines the spacing between the neck ring holders 7 and 9 when the latter are in the fully open position.

Disposed between the neck ring holders 7 and 9 are the neck ring moulds each of which comprises a central guide ring 16 and two neck ring parts 17. In total there are four neck ring parts 17 arranged in two pairs, the two neck ring parts 17 of each pair being associated with a corresponding one of the two parison moulds. A corresponding one of four springs 11 is disposed between each neck ring part 17 and the corresponding neck ring holder 7 or 9 in order to accommodate any misalignment between the neck ring parts 17 and the intermediate moulds 21 at the blank station.

Figure 2:
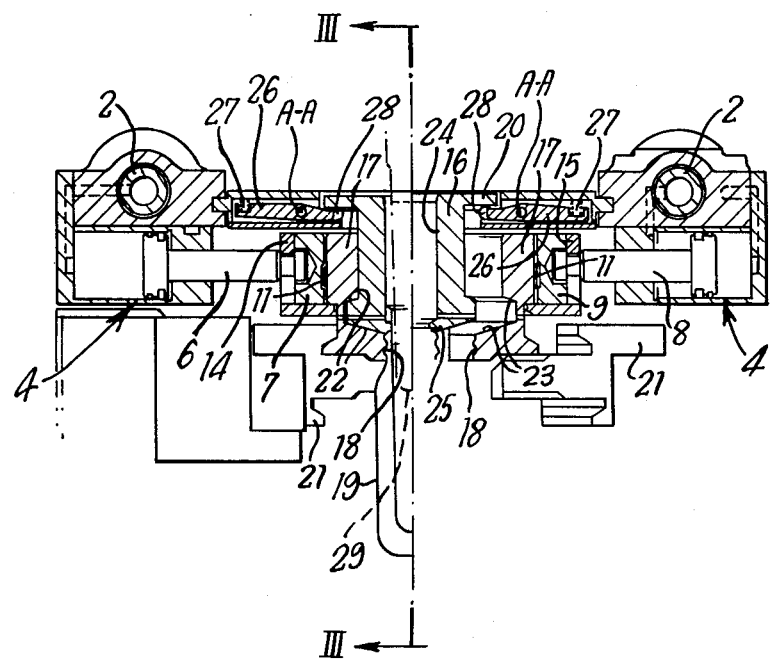
FIG. 2 is a sectional view on the line II—II of FIG. 1.
Figure 3:
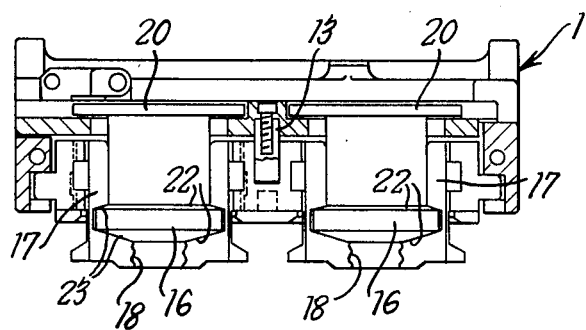
FIG. 3 is a sectional view on the line III—III of FIG. 2.

As shown in FIG. 2, each neck ring part 17 has an inwardly facing mould portion 18 defining the shape of the beads of the finish of the parisons to be made in the machine, the half of one such parison being indicated schematically at 19 in FIG. 2. A corresponding one of the two guide rings 16 is positioned between each pair of neck ring parts 17. Each guide ring 16 has an outwardly projecting annular flange 20 at its upper end and an outwardly projecting shoulder with sloping frusto-conical surfaces 22 at its lower end, these frusto-conical surfaces 22 being complementary with similarly shaped surfaces 23 of part-circular grooves formed in the neck ring parts 17. Each guide ring 16 has a through bore 24 restricted at its lower end by an inwardly projecting lip 25. The underside of the lip 25 defines the mould for the sealing surface of each parison.

Each guide ring 16 is urged upwardly by a corresponding pair of opposed levers 26 pivoted about horizontal axes A—A parallel to the axis X—X. Each lever 26 is biased by a corresponding pair of helical compression springs 27 in such manner that a branched or splayed inner end 28 of the lever 26 engages under the flange 20 of the corresponding guide ring 16 to urge the latter to the raised position shown on the right-hand side of FIG. 2. The branched or splayed end 28 of each lever 26 has the effect of spreading the lifting force applied to the corresponding guide ring 16.

When the carriage 1 is at the blank station, the piston rods 6 and 8 are in their extended positions so that the neck ring holders 7 and 9 are closed. In this position, the frusto-conical surfaces 22 and 23 on the guide rings 16 and the neck ring parts 17 interengage in order to retain the guide rings 16 in their lowered position against the influence of the spring-loaded levers 26, as illustrated on the left-hand side of FIG. 2. The lip 25 co-operates with the neck ring parts 17 to define the mould portion for the finish of each parison. The intermediate moulds 21 and lower moulds (not shown) are also closed. Plungers (one of which is partially shown in broken lines at 29 on the left-hand side of FIG. 2) are guided through the respective bores 24 in the guide rings 16 and pass into the parison moulds in order to form the parisons therein.

On retraction of the plungers 29 and opening of the intermediate and lower moulds at the blank station, the carriage 1 is moved to the intermediate station, pressure being maintained in the piston and cylinder devices 4 to retain the neck ring parts 17 in their closed position around the finish of each parison. At the intermediate station, the supply of compressed air is diverted from the bore 5 of one guide rail 2 to the bore 5 of the other guide rail 2 so as to cause the piston rods 6 and 8 to move to their retracted positions, resulting in opening movement of the neck ring holders 7 and 9. The plates 10 and 12 draw the neck ring parts 17 outwardly, resulting in disengagement of the frusto-conical surfaces 22 and 23. As the frusto-conical surfaces 22 and 23 disengage, the biasing applied by the spring-loaded levers 26 causes each guide ring 16 to move upwardly to the raised position so that the lowermost extremity of the guide ring 16 clears the released parison on return movement of the carriage 1 to the blank station.

I claim:

1. A glassware forming machine comprising a carriage, a blank station at which parisons are formed in upwardly open parison moulds from gobs of molten glass, and a further station, the carriage being reciprocable in a straight line between the blank station and the further station in order to transfer parisons from the blank station to the further station, the carriage having a neck ring mould comprising neck ring parts and an element which defines the sealing surface of the finish of each parison, and the carriage having means for raising and lowering said element relative to the neck ring parts, the element being raised when the carriage is at the further station in order that said element should clear the released parisons on return movement of the carriage to the blank station.

2. A glassware forming machine according to claim 1, including means for synchronizing the raising and lowering of the element with opening and closing movements of the neck ring parts, respectively.

3. A glassware forming machine according to claim 2, wherein the means for raising and lowering the element comprises spring-loaded members which urge said element upwardly and co-operating surfaces on the element and on the neck ring parts, the co-operating surfaces interengaging when the neck ring parts are closed to hold the element in the lowered position against the influence of the spring-loaded members.

4. A glassware forming machine according to claim 3, wherein the co-operating surfaces are frusto-conical in shape.

5. A glassware forming machine according to claim 3 or 4, wherein there are two of said spring-loaded members which engage opposite sides of the element.

6. A glassware forming machine according to claim 1, wherein said element comprises a guide ring which a central through bore for guiding movements of a parison plunger.

* * * * *